(12) United States Patent
Hu

(10) Patent No.: US 11,221,978 B2
(45) Date of Patent: Jan. 11, 2022

(54) INTERRUPT SYSTEM FOR RISC-V ARCHITECTURE

(71) Applicant: Nuclei System Technology Co., Ltd., Wuhan (CN)

(72) Inventor: Zhenbo Hu, Wuhan (CN)

(73) Assignee: NUCLEI SYSTEM TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 16/860,083

(22) Filed: Apr. 28, 2020

(65) Prior Publication Data

US 2021/0034558 A1 Feb. 4, 2021

(30) Foreign Application Priority Data

Mar. 15, 2019 (CN) .......................... 201910198363.3

(51) Int. Cl.
*G06F 13/24* (2006.01)
*G06F 9/48* (2006.01)
*G06F 9/32* (2018.01)
*G06F 9/30* (2018.01)

(52) U.S. Cl.
CPC .......... *G06F 13/24* (2013.01); *G06F 9/30098* (2013.01); *G06F 9/30101* (2013.01); *G06F 9/327* (2013.01); *G06F 9/48* (2013.01); *G06F 9/4812* (2013.01); *G06F 2209/481* (2013.01)

(58) Field of Classification Search
CPC .......... G06F 13/24; G06F 9/48; G06F 9/4812; G06F 9/327; G06F 9/30101; G06F 2209/481
See application file for complete search history.

(56) References Cited

U.S. PATENT DOCUMENTS

| 6,496,517 | B1* | 12/2002 | Gehman | ................ G06F 13/24 370/419 |
| 6,742,065 | B1 | 5/2004 | Suh | |
| 2004/0015628 | A1* | 1/2004 | Glasco | ................ G06F 13/24 710/260 |
| 2017/0177367 | A1* | 6/2017 | DeHon | ................ G06F 21/52 |
| 2019/0392156 | A1* | 12/2019 | Garlati | ................ G06F 8/61 |

OTHER PUBLICATIONS

"SiFive E20 Core Complex Manual v1p0"; SiFive, Inc.; Jun. 29, 2018. (Year: 2018).*

* cited by examiner

*Primary Examiner* — Glenn A. Auve
(74) *Attorney, Agent, or Firm* — Bayramoglu Law Offices LLC

(57) ABSTRACT

An interrupt system for RISC-V architecture includes an original register in a CLIC, a pushmcause register, a pushmepc register, an interrupt response register, and an mtvt2 register; the pushmcause register is used to store a value in an mcause on a stack by means of an instruction; the pushmepc register is used to store a value in an mepc on a stack by means of an instruction; the interrupt response register is used to respond to a non-vectored interrupt request issued by a CLIC by means of an instruction, obtain an interrupt subroutine entry address, and modify a global interrupt enable; and the mtvt2 register is used to store a base address of an non-vectored interrupt in a CLIC mode.

18 Claims, 4 Drawing Sheets

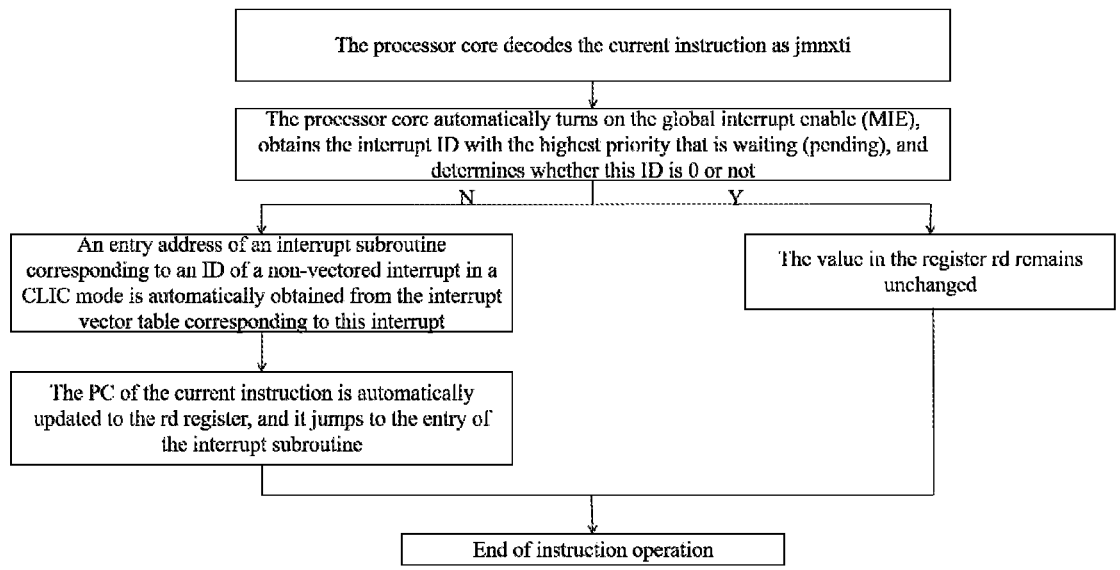

FIG. 7

```
service_loop:                #service_loop used for processing an interrupt tail biting;
    lw a1, (a0)              #writing the data (an entry address of an interrupt subroutine) of the address to which
                              the a0 register is directed into the a1 resister;
    csrrsi  x0, mstatus, MIE #turning on the global interrupt enable MIE;
    jalr a1                  #jumping to an entry of an interrupt subroutine corresponding to a current interrupt ID;
                             #returning and jumping to a next instruction execution after the interrupt subroutine is
                              executed;
    csrrsi  a0, mnxti, MIE   #determining whether the interrupt tail biting occurs or not;
    bnez a0, service_loop    #If the interrupt tail biting occurs, a program jumping to service_loop to continue to
                              process interrupt;
                             #otherwise, the program proceeding for subsequent execution;
    ...
```

FIG. 8

INTERRUPT SYSTEM FOR RISC-V ARCHITECTURE

CROSS REFERENCE TO THE RELATED APPLICATIONS

This application is based upon and claims priority to Chinese Patent Application No. 201910198363.3, filed on Mar. 15, 2019, the entire contents of which are incorporated herein by reference.

TECHNICAL FIELD

The present invention relates to the technical field of low-power core interrupt processing, and in particular to an interrupt system for RISC-V architecture.

BACKGROUND

An application binary interface (ABI) defines some general-purpose registers to implement special functions. In RISC-V, an X1 register is defined as a ra register (also referred to as link register), which is used to store an address returned by a function, and an X2 register is defined as an sp register, which is used to store a stack pointer.

An interrupt mechanism (Interrupt) is that a processor core is interrupted by other requests in the process of sequentially executing a program instruction flow and suspends the execution of a current program, turns to process other things, and after it has finished processing of the other things, then returns to a point where the previous program is interrupted and continues to execute the previous program instruction flow. The "other requests" that interrupt the processor's execution of the program instruction flow are referred to as interrupt requests, and a source of the interrupt request is referred to as an interrupt source (Interrupt Source). In general, the interrupt source is mainly from peripheral hardware equipment. Moreover, the processor turning to process "other things" is called an interrupt service routine (ISR).

Interrupt processing is a normal mechanism, not an error. After the processor receives an interrupt request, it needs to protect the current program site, which is simply referred to as the protection site. After processing the interrupt service routine, the processor needs to restore the previous site, so as to continue to execute the program that was interrupted before, which is simply referred to as restoring the site.

In order to add an interrupt mechanism with low latency, support for vector modes and support for nesting, to a RISC-V system, RISC-V has officially added a CLIC interrupt mechanism (Core-Local Interrupt Controller) to a RISC-V standard. CLIC can be compatible with and replace the existing CLINT interrupt mechanism (Core-Local Interrupt). Compared to the CLINT interrupt mechanism, the CSR registers involved in the CLIC interrupt mechanism are as follows:

an mstatus register for storing an interrupt or abnormality processing mode state;

an medeleg register for re-directing an abnormality to a corresponding privileged mode for processing;

an mideleg register for re-directing an interrupt to a corresponding privileged mode for processing;

an mie register for masking a corresponding interrupt in a non-CLIC mode;

an mtvec register for storing an abnormality or interrupt entry address;

an mtvt register for storing a base address of a vectored interrupt in a CLIC mode;

an mscratch register for temporarily saving some data in a program in a machine mode;

an mepc register for storing a return address of an abnormality or interrupt;

an mcause register for storing an abnormality reason;

an mtval register for storing an address or instruction that caused an abnormality;

an mip register for querying an interrupt waiting state;

an mnxti register for obtaining an interrupt entry address and modifying a global interrupt enable;

an mintstatus register including three domains of mil, sil, and uil, which are used to query levels of corresponding interrupts in a machine mode, a manager mode, and a user mode, respectively;

an mscratchcsw register for data exchange when a privilege mode is switched;

an mscratchcsw1 register for interrupting data exchange when the levels are switched; and an mnxti register for turning on a global interrupt enable (MIE) by means of an instruction "csrrsi a0, mnxti, MIE", and performing the following operations: if a privilege mode of a current interrupt is the machine mode, the level of the current interrupt is greater than that mpil (interrupt level of the last interrupt) in the mcause, and the shy bit corresponding to the current interrupt ID is 0, then the return value is a pointer of an entry address of an interrupt subroutine of the current interrupt ID, the mil domain of the mintstatus is updated to the current interrupt level, and the exccode domain of the mcause is updated to the current interrupt ID; otherwise 0 is returned.

Among them, csrrsi is a CSR instruction defined in the RISC-V official architecture, which is used to operate the CSR register (control state register) of the core. The instruction has a format of "csrrsi rd, csr, imm", where csrrsi is a name of the instruction, rd is a destination operand register of the instruction, csr is a certain control state register in the core, and imm is one 5-bit immediate number. csrrsi completes two operations: 1) reading out a value of the CSR register indexed by csr and writing it back to the destination operand register, and 2) taking the value of the 5-bit immediate number (higher bits being supplemented by 0 for extension) as a reference bit by bit, and if a certain bit of the value is 1, then a corresponding bit position in the CSR register indexed by csr is 1, and other bits are not affected. It can be seen that when an instruction "csrrsi a0, mnxti, MIE" is used to operate the mnxti register, in addition to completing the basic operation of csrrsi, it may also obtain the pointer of the entry address of the interrupt subroutine of the current interrupt ID or perform other operations.

In addition, the RISC-V official architecture also defines two CSR instructions of csrrwi and csrrw, which are used to the CSR register (control state register) of the core. The csrrwi instruction has a format of "csrrwi rd, csr, imm", where csrrwi is a name of the instruction, rd is a destination operand register of the instruction, csr is a certain control state register in the core, and imm is one 5-bit immediate number. csrrwi completes two operations: 1) reading out the value of the CSR register indexed by the csr, and writing it back to the destination operand register, and 2) writing the value of the 5-bit immediate number (higher bits being supplemented by 0 for extension) into the CSR register indexed by the csr. The csrrw instruction has a format of "csrrw rd, csr, rs1", where csrrw is a name of the instruction, rd is a destination operand register of the instruction, csr is a certain control state register in the core, and rs1 is a source operand register. csrrw completes two operations: 1) reading out the value of the CSR register indexed by csr and writing it back to the destination operand register, and 2) writing the value in the source operand register rs1 into the CSR register indexed by csr. Taking saving of mcause as an example, the prior art requires two instructions to implement, the first is to first read a value of mcause into a general register, and the second is to write a value of a corresponding general register to a stack. Saving of mepc is similar.

In addition, during non-vectored interrupt processing without tail biting, after saving the context, the prior art needs 5 instructions to complete the corresponding interrupt subroutine. The specific processing process is as follows: 1) obtaining interrupt information; 2) determining whether there is still an interrupt or not; 3) obtaining the entry of the interrupt subroutine; 4) ensuring that the global interrupt enable MIE is turned on; and 5) jumping to the entry of the interrupt subroutine for execution. It can be seen that the efficiency of jumping to the entry of the corresponding interrupt subroutine is low during non-vector interrupt processing.

In addition, there is a situation of interrupt tail biting. At some point, there may be multiple interrupts that are waiting for the processor to respond. It is known that each interrupt operation is mainly divided into three steps: stack in+ISR (Interrupt Service Routines)+stack out. In actual applications, there may be a situation where the ISR currently being executed by the processor is a high-priority interrupt, but there are several low-priority interrupts being requested at the same time, then after the current high-priority interrupt is executed, the next low-priority interrupt will be executed immediately. The processing steps that do not support interrupt tail biting are: stack in+high-priority ISR+stack out+stack in+low-priority ISR+stack out. It can be seen that the middle stack out+stack in operations are meaningless and the two steps can be omitted. The processing steps that support interrupt tail biting are: stack in+high priority ISR+low priority ISR+stack out, which greatly improves the efficiency of interrupt processing. In the existing CLIC mechanism, the interrupt tail biting needs 5 instructions to complete the corresponding interrupt subroutine. The specific processing process is as follows: 1) obtaining information of interrupt tail biting; 2) determining whether there is still interrupt tail biting or not; 3) obtaining the entry of the interrupt subroutine; 4) ensuring that the global interrupt enable MIE is turned on; and 5) jumping to the entry of the interrupt subroutine for execution. It can be seen that the efficiency of jumping to the entry of the corresponding interrupt subroutine is low during non-vector interrupt tail biting.

Compared with the CLINT interrupt mechanism, the interrupt processing performance of the CLIC interrupt mechanism has been greatly improved, and the interrupt response speed has been significantly accelerated. However, the saving speed of mcause and mepc in the interrupt mechanism of CLIC is slow, and the efficiency of jumping to the entry of the corresponding interrupt subroutine is low.

SUMMARY

In order to solve the above technical problems, the present invention proposes an interrupt system for RISC-V architecture so as to increase the speed of saving the value in the register, shorten the time for jumping to the entry of the corresponding interrupt subroutine, and improve the efficiency.

In order to achieve the above objective, the technical solution of the present invention is as follows:

An interrupt system applicable to RISC-V architecture, comprising a machine mode abnormality or interrupt return address register (hereinafter simply referred to as mepc register) and a machine mode abnormality cause register (hereinafter simply referred to as mcause register), and characterized by further comprising a machine mode abnormality cause stack register (hereinafter simply referred to as pushmcause register), and/or a machine mode abnormality or interruption return address stack register (hereinafter simply referred to as pushmepc register), and/or an interrupt response register, and/or a base address register (hereinafter simply referred to as mtvt2 register) of a non-vectored interrupt in a CLIC mode, wherein:

the pushmcause register is a CSR register, and is used to store a value in the mcause register into a stack by means of an instruction;

the pushmepc register is a CSR register, and is used to store a value in the mepc register into a stack by means of an instruction;

the interrupt response register is a CSR register, and is used to respond to a non-vectored interrupt request issued in the CLIC mode by means of an instruction, obtain an interrupt subroutine entry address, and modify a global interrupt enable; and the mtvt2 register is a CSR register, and is used to separate the non-vectored interrupt in the CLIC mode and an abnormality entry and store the base address of the non-vectored interrupt in the CLIC mode.

Preferably, a corresponding instruction used to store a value in the mcause register into a stack by the pushmcause register is: "csrrwi x0, pushmcause, offset", and the instruction includes an operator csrrwi, a destination operand x0, a csr register pushmcause, and an immediate number offset.

Preferably, a corresponding instruction used to store a value in the mepc register into a stack by the pushmepc register is: "csrrwi x0, pushmepc, offset", and the instruction includes an operator csrrwi, a destination operand x0, a csr register pushmepc, and an immediate number offset.

Preferably, the interrupt response register is a mintsel_jal register or a jalmnxti register, and in the mintsel_jal register, an instruction used to implement the non-vectored interrupt request issued by a CLIC is: "csrrw ra, mintsel_jal, ra"; and in the jalmnxti register, an instruction used to implement the non-vectored interrupt request issued by the CLIC is: "csrrw ra, jalmnxti, ra".

Preferably, the instruction "csrrw ra, mintsel_jal, ra" includes an operator csrrw, a destination operand ra, a csr register mintsel_jal, and a source operand ra, is used to automatically turn on the global interrupt enable after context is saved, automatically obtain an entry address of an interrupt subroutine corresponding to an ID of the non-vectored interrupt in the CLIC mode from an interrupt vector table corresponding to the interrupt, automatically update a PC of a current instruction to a ra register, and jump to an entry of the interrupt subroutine; and is further used to automatically turn on the global interrupt enable after non-vectored interrupt tail biting occurs, automatically obtain an entry address of an interrupt subroutine corresponding to an ID of the non-vectored interrupt in the CLIC mode from an interrupt vector table corresponding to the interrupt, automatically update a PC of a current instruction to the ra register, and jump to an entry of the interrupt subroutine.

Preferably, the instruction "csrrw ra,jalmnxti,ra" includes an operator csrrw, a destination operand ra, a csr register jalmnxti, and a source operand ra, is used to automatically turn on the global interrupt enable (MIE) after context is saved, automatically obtain an entry address of an interrupt subroutine corresponding to an ID of the non-vectored interrupt in the CLIC mode from an interrupt vector table corresponding to the interrupt, automatically update a next PC of a current instruction to a ra register, and jump to an entry of the interrupt subroutine; and is further used to automatically obtain an entry address of an interrupt subroutine corresponding to an ID of the non-vectored interrupt in the CLIC mode from an interrupt vector table corresponding to the interrupt after non-vectored interrupt tail biting occurs, automatically update a next PC of a current instruction to the ra register, and jump to an entry of the interrupt subroutine.

A system applicable to RISC-V architecture, the system comprising: a machine mode abnormality or interrupt return register (hereinafter simply referred to as mepc register), and a machine mode abnormality cause register (hereinafter simply referred to as mcause register), and characterized by further comprising a mcause data direct write instruction (hereinafter simply referred to as swmcause instruction), and/or a mepc data direct write instruction (hereinafter simply referred to as swmepc instruction), and/or an interrupt entry jump instruction (hereinafter simply referred to as jmnxti instruction), and/or a base address register (hereinafter simply referred to as mtvt3 register) for a non-vectored interrupt in a CLIC mode, wherein:

the swmcause instruction is used to store a value in the mcause on a stack by means of an instruction;

the swmepc instruction is used to store a value in the mepc on a stack by means of an instruction;

the jmnxti instruction is used to respond to the non-vectored interrupt request issued by a CLIC by means of an instruction; and the mtvt3 register is used to separate the non-vectored interrupt in the CLIC mode and an abnormality entry and store the base address of the non-vectored interrupt in the CLIC mode.

Preferably, in the swmcause instruction, an instruction used to store a value in the mcause register into a stack is: "swmcause offset (sp)", and the instruction includes an operator swmcause, a source operand sp, and an immediate number offset.

Preferably, in the swmepc instruction, an instruction used to store a value in the mepc register into a stack is: "swmepc offset(sp)", and the instruction includes an operator swmcause, a destination operand x0, a source operand sp, and an immediate number offset.

Preferably, in the jmnxti instruction, an instruction used to respond to the non-vectored interrupt request issued by the CLIC is: "jmnxti ra", and the instruction includes an operator jmnxti, and a destination operand ra, is used to automatically turn on a global interrupt enable after context is saved, automatically obtain an entry address of an interrupt subroutine corresponding to an ID of the non-vectored interrupt in the CLIC mode from an interrupt vector table corresponding to the interrupt, automatically update a next PC of a current instruction to a ra register, and jump to an entry of the interrupt subroutine; and is further used to automatically turn on the global interrupt enable after non-vectored interrupt tail biting occurs, automatically obtain an entry address of an interrupt subroutine corresponding to an ID of the non-vectored interrupt in the CLIC mode from an interrupt vector table corresponding to the interrupt, automatically update a PC of a current instruction to a destination register, and jump to an entry of the interrupt subroutine.

An interrupt optimization method based on RISC-V architecture, comprising the following steps:

S1: receiving an interrupt request and stopping executing a current program flow;

S2: jumping to a base address of a non-vectored interrupt in a CLIC mode;

S3: triggering a first instruction or a second instruction, wherein the first instruction can directly write a value of a CSR register mcause to a stack, and update the value of mcause to a destination register while writing to the stack; and the second instruction can directly write a value of a current interrupt return address directly to the stack, and update a value of mepc to the destination register while writing to the stack;

S4: turning on a global interrupt enable, and obtaining an interrupt ID with the highest priority that is waiting, and determining whether the interrupt ID is 0 or not, and if it is, then going to S5; and if it is not, then going to S6;

S5: the value in the destination register remaining unchanged; and

S6: obtaining an entry address of an interrupt subroutine corresponding to an ID of the non-vectored interrupt in the CLIC mode from an interrupt vector table corresponding to the interrupt, updating an address of a current instruction to the destination register, and jumping to an entry of the interrupt subroutine.

Preferably, before the step S1, the method further comprises step S7: separating the non-vectored interrupt from a unique entry address of abnormality, wherein a program can jump to a specified address of the non-vectored interrupt.

Preferably, the specified address is specified by the mtvt2 register of the mtvt3 register.

Preferably, in the step S6, the entry address of the interrupt subroutine corresponding to the ID of the non-vectored interrupt in the CLIC mode is obtained from the interrupt vector table corresponding to the interrupt, an address of a next instruction of the current instruction is updated to the destination register, and it is jumped to the entry of the interrupt subroutine.

An electronic device, comprising: a memory, a processor, and a computer program stored on the memory and executable on the processor, the computer program implementing the steps of the method described above when executed by the processor.

A computer-readable storage medium, characterized in that the computer-readable storage medium stores one or more programs, which when executed by a server including a plurality of application programs, causes the server to implement the steps of the method described above when executed.

An interrupt optimization method based on RISC-V architecture, comprising the following steps:

S8: receiving an interrupt request and stopping executing a current program flow; and S9: jumping to a base address of a non-vectored interrupt in a CLIC mode.

An interrupt optimization method based on RISC-V architecture, comprising the following steps:

S10: receiving a non-vectored interrupt request and stopping a current program flow;

S11: a program jumping to a unified entry of a non-vector interrupt, and starting to save context; and S12: triggering a first instruction or a second instruction, wherein the first instruction can directly write a value of a CSR register mcause to a stack, and update a value of a machine mode abnormality cause register to a destination register while writing to the stack; and the second instruction can directly write a value of a current interrupt return address directly to the stack, and update a value of a machine mode abnormality or interrupt return address register to the destination register while writing to the stack.

An interrupt optimization method based on RISC-V architecture, comprising the following steps:

S13:receiving a non-vectored interrupt request and stopping a current program flow;

S14:completing saving of context;

S15:turning on a global interrupt enable, and obtaining an interrupt ID with the highest priority that is waiting, and determining whether the interrupt ID is 0 or not, and if it is, then going to S16; and if it is not, then going to S17;

S16:writing a current instruction into a destination register and jumping to an entry of the interrupt subroutine; and S17:obtaining an entry address of an interrupt subroutine corresponding to an ID of the non-vectored interrupt in the CLIC mode from an interrupt vector table corresponding to the interrupt, updating an address of a current instruction to the destination register, and jumping to an entry of the interrupt subroutine.

An interrupt optimization method based on RISC-V architecture, comprising the following steps:

S18:responding to a previous interrupt and exiting a corresponding interrupt subroutine;

S19:turning on a global interrupt enable, and obtaining an interrupt ID with the highest priority that is waiting, and determining whether the interrupt ID is 0 or not, and if it is, then going to S20; and if it is not, then going to S21;

S20:writing a current instruction into a destination register and jumping to an entry of the interrupt subroutine; and S21:obtaining an entry address of an interrupt subroutine corresponding to an ID of the non-vectored interrupt in the CLIC mode from an interrupt vector table corresponding to the interrupt, updating an address of a current instruction to the destination register, and jumping to an entry of the interrupt subroutine.

The present invention has the following advantages:

(1). By increasing a CSR register pushmcause on the premise of the CLIC mode, the present invention is used to accelerate saving of mcause in the interrupt response process, and shorten the saving time of mcause from 2 clock cycles to 1 clock cycle, thereby shortening the time of jumping to the entry of the corresponding interrupt subroutine.

(2). By increasing a CSR register pushmepc on the premise of the CLIC mode, the present invention is used to accelerate saving of mepc in the interrupt response process, and shorten the saving time of mepc from 2 clock cycles to 1 clock cycle, thereby shortening the time of jumping to the entry of the corresponding interrupt subroutine.

(3). The present invention can add a base address register mtvt2 or mtvt3 dedicated to the non-vectored interrupt in the CLIC model in the processor core without adding too much overhead, separate the non-vectored interrupt in the CLIC mode from the abnormality entry, so that the time (1 clock cycle) spent by judging mcause is saved in the interrupt response process, thereby shortening the time of jumping to the entry of the corresponding interrupt subroutine.

(4). By adding a CSR register mintsel_jal or a CSR register jalmnxti, the present invention is used to compress the time from saving the context to jumping to the corresponding interrupt processing subroutine in the non-vector interrupt response process, thereby shortening the time of jumping to the entry of the corresponding interrupt subroutine, and compress the time from the occurrence of the interrupt tail biting to jumping to the corresponding interrupt processing subroutine in the process of non-vector tail biting interrupt response, thereby shortening the time of jumping to the entry of the corresponding interrupt subroutine.

(5). By adding an instruction swmcause to implement a fast interrupt method, the present invention is used to accelerate saving of mcause in the interrupt response process, and shorten the saving time of mcause from 2 clock cycles to 1 clock cycle, thereby shortening the time of jumping to the entry of the corresponding interrupt subroutine.

(6). By adding an instruction "swmepc" to implement a fast interrupt method, the present invention is used to accelerate saving of mepc in the interrupt response process, and shorten the saving time of mepc from 2 clock cycles to 1 clock cycle, thereby shortening the time of jumping to the entry of the corresponding interrupt subroutine.

(7). By adding an instruction "jmnxti ra" to implement a fast interrupt method, the present invention is used to compress the time from saving the context to jumping to the corresponding interrupt processing subroutine in the non-vector interrupt response process, thereby shortening the time of jumping to the entry of the corresponding interrupt subroutine, and compress the time from the occurrence of the interrupt tail biting to jumping to the corresponding interrupt processing subroutine in the process of non-vector tail biting interrupt response, thereby shortening the time of jumping to the entry of the corresponding interrupt subroutine.

BRIEF DESCRIPTION OF THE DRAWINGS

In order to more clearly explain the embodiments of the present invention or the technical solutions in the prior art, the accompanying drawings required for the description of the embodiments or the prior art will be briefly introduced below.

FIG. 7 is an operation flow chart of an instruction "jmnxti rd" disclosed in an embodiment of the present invention; and FIG. 8 is a program diagram of a response process of non-vectored interrupt tail-biting in a CLIC mode of the prior art disclosed in an embodiment of the present invention.

DETAILED DESCRIPTION OF THE EMBODIMENTS

Figure 1:
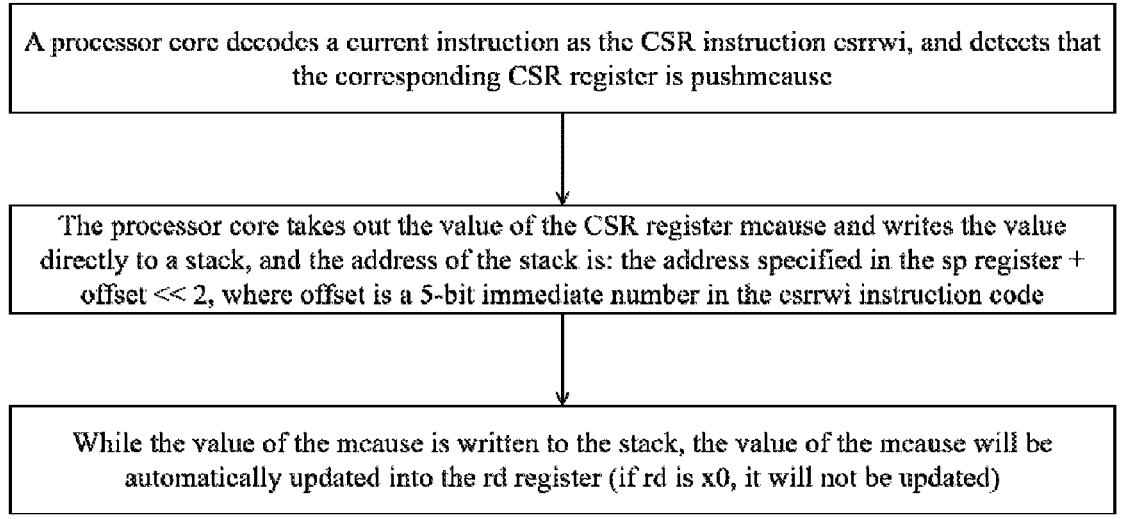
FIG. 1 is an operation flow chart of an instruction "csrrwi rd, pushmcause, offset" disclosed in an embodiment of the present invention.

The technical solutions in the embodiments of the present invention will be described clearly and completely below in conjunction with the accompanying drawings in the embodiments of the present invention.

The present invention provides an interrupt system for RISC-V architecture. Its working principle is to reduce the number of instructions operating by increasing a register or changing some instructions to achieve the purpose of increasing the speed of saving the value in the register, shortening the time of jumping to the entry of the corresponding interrupt subroutine and improving the efficiency.

The present invention will be further described in detail below in conjunction with the embodiments and specific implementations:

An interrupt system for RISC-V architecture, the system comprising: an mstatus register, an medeleg register, an mideleg register, an mie register, an mtvec register, an mtvt register, an mscratch register, an mepc register, an mcause register, an mtval register, an mip register, an mnxti register, an mintstatus register, an mscratchcsw register and an mscratchcsw1 register, and further comprising: a pushmcause register, and/or a pushmepc register, and/or an interrupt response register, and/or an mtvt2 register;

wherein the pushmcause register is used to store a value in the mcause on a stack by means of an instruction;

the pushmepc register is used to store a value in the mepc on a stack by means of an instruction;

the interrupt response register is used to respond to a non-vectored interrupt request issued by a CLIC by means of an instruction, obtain and jump to an interrupt subroutine entry address, and modify a global interrupt enable; and the mtvt2 register is used to store a base address of an non-vectored interrupt in a CLIC mode.

The mstatus register is used to store an interrupt or abnormality processing mode state;

the medeleg register is used to re-direct an abnormality to a corresponding privileged mode for processing;

the mideleg register is used to re-direct an interrupt to a corresponding privileged mode for processing;

the mie register is used to mask a corresponding interrupt in a non-CLIC mode;

the mtvec register is used to store an abnormality or interrupt entry address;

the mtvt register is used to store a base address of a vectored interrupt in a CLIC mode;

the mscratch register is used to temporarily save some data in a program in a machine mode;

the mepc register is used to store a return address of an abnormality or interrupt;

the mcause register is used to store an abnormality reason;

the mtval register is used to store an address or instruction that caused an abnormality;

the mip register is used to query an interrupt waiting state;

the mnxti register is used to obtain an interrupt entry address and modify a global interrupt enable;

the mintstatus register includes three domains of mil, sil, and uil, which are used to query levels of corresponding interrupts in a machine mode, a manager mode, and a user mode, respectively;

the mscratchcsw register is used for data exchange when a privilege mode is switched;

the mscratchcsw1 register is used to interrupt data exchange when the levels are switched;

the mnxti register is used to turn on a global interrupt enable (MIE) by means of an instruction "csrrsi a0, mnxti, MIE", and perform the following operations: if a privilege mode of a current interrupt is the machine mode, the level of the current interrupt is greater than that mpil (interrupt level of the last interrupt) in the mcause, and the shy bit corresponding to the current interrupt ID is 0, then the return value is a pointer of an entry address of an interrupt subroutine of the current interrupt ID, the mil domain of the mintstatus is updated to the current interrupt level, and the exccode domain of the mcause is updated to the current interrupt ID; otherwise 0 is returned;

the pushmcause register is a CSR register, and is used to store a value in the mcause in a stack, and a corresponding instruction is: "csrrwi x0, pushmcause, offset"; and the pushmepc register is a CSR register, and is used to store a value in the mepc in a stack, and a corresponding instruction is: "csrrwi x0, pushmepc, offset".

An operation flow of the instruction "csrrwi x0, pushmcause, offset" is as shown in FIG. 1: a processor core decodes a current instruction as the CSR instruction csrrwi, and detects that the corresponding CSR register is pushmcause; and the processor core will not actually execute an operation of csrrwi defined in the RISC-V official architecture, but takes out the value of the CSR register mcause and writes the value directly to a stack, and the address of the stack is: the address specified in the sp register+offset<<2, where offset is a 5-bit immediate number in the csrrwi instruction code; and while the hardware writes the value of the mcause to the stack, it will automatically update the value of the mcause into the rd register (if rd is x0, it will not be updated). It can be seen that since the value of the mcause is directly written to the stack, the processing clock cycle is compressed from 2 to 1.

Figure 2:
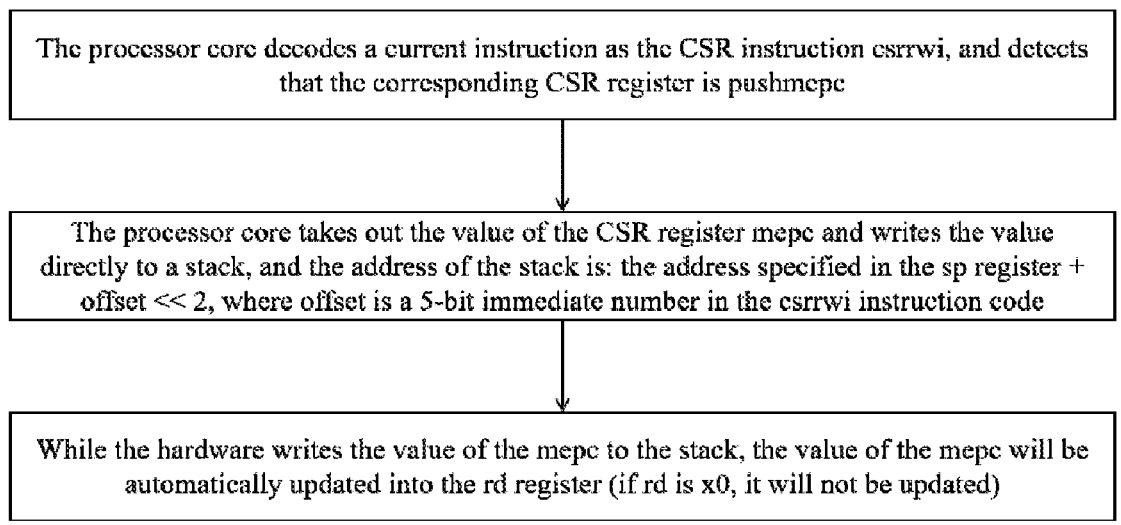
FIG. 2 is an operation flow chart of an instruction "csrrwi rd,pushmepc,offset" disclosed in an embodiment of the present invention.

An operation flow of the instruction "csrrwi x0, pushmepc, offset" is as shown in FIG. 2: the processor core decodes a current instruction as the CSR instruction csrrwi, and detects that the corresponding CSR register is pushmepc; and the processor core will not actually execute an operation of csrrwi defined in the RISC-V official architecture, but takes out the value of the CSR register mepc and writes the value directly to a stack, and the address of the stack is: the address specified in the sp register+offset<<2, where offset is a 5-bit immediate number in the csrrwi instruction code; and while the hardware writes the value of the mepc to the stack, it will automatically update the value of the mepc into the rd register (if rd is x0, it will not be updated). It can be seen that since the value of the mepc is directly written to the stack, the processing clock cycle is compressed from 2 to 1.

The interrupt response register is a mintsel_jal register or a jalmnxti register, and in the mintsel_jal register, an instruction used to implement the non-vectored interrupt request issued by a CLIC is: "csrrw ra, mintsel_jal, ra"; and in the jalmnxti register, an instruction used to implement the non-vectored interrupt request issued by the CLIC is: "csrrw ra, jalmnxti, ra".

The instruction "csrrw ra, mintsel_jal, ra" is used to perform a series of operations after the context is saved, and then jump to the entry address of the interrupt subroutine corresponding to the interrupt ID; and is further used to perform a series of operations after non-vectored interrupt tail biting is occurred, and then jump to the entry of the interrupt subroutine corresponding to the interrupt ID.

Figure 3:
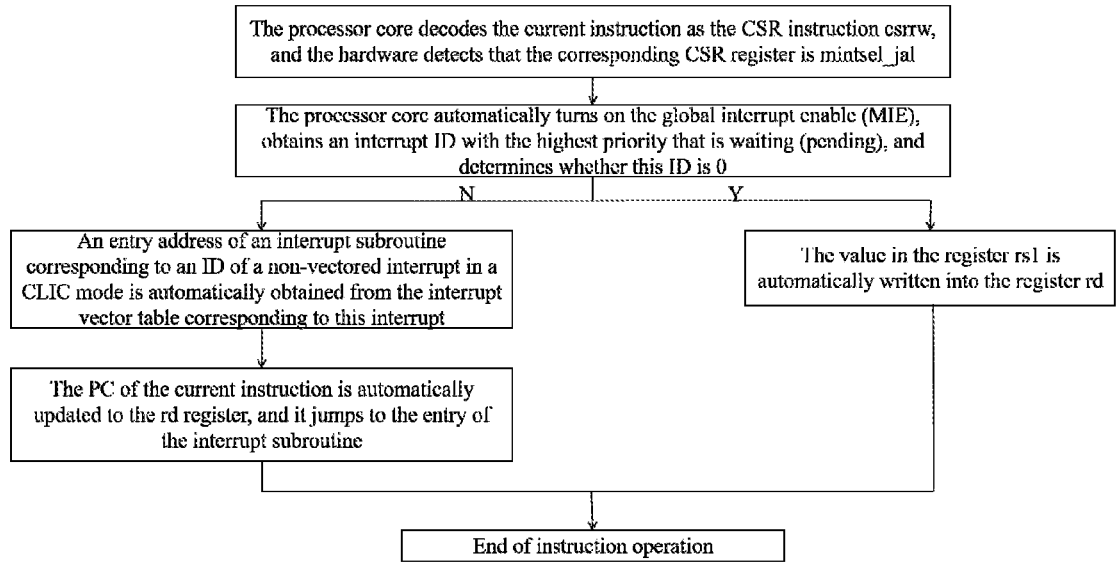
FIG. 3 is an operation flow chart of an instruction "csrrw rd, mintsel_jal, rs1" disclosed in an embodiment of the present invention.

An operation flow of the instruction "csrrw ra, mintsel_jal, ra" is as shown in FIG. 3: the processor core hardware decodes the current instruction as the CSR instruction csrrw, and the hardware detects that the corresponding CSR register is mintsel_jal; and the processor core will not execute the csrrw instruction according to the manner specified by the RISC-V official architecture, but automatically turns on the global interrupt enable (MIE), obtains an interrupt ID with the highest priority that is waiting (pending), and determines whether this ID is 0 or not, and if it is not 0, automatically obtains an entry address of an interrupt subroutine corresponding to an ID of a non-vectored interrupt in a CLIC mode from the interrupt vector table corresponding to this interrupt, automatically updates the PC of the current instruction to the ra register, and jumps to the entry of the interrupt subroutine; otherwise, if the ID part of the interrupt is 0, the value in the register ra remains unchanged. In actual applications, rd and rs1 in FIG. 3 are generally link registers (ra). The instruction "csrrsi a0, mnxti, MIE" in the background art can only realize the functions of automatically turning on the global interrupt enable (MIE), obtaining the interrupt ID with the highest priority that is waiting (pending) and obtaining the pointer of the entry address of the interrupt subroutine of the current interrupt ID. However, in addition to the function of implementing the function of "csrrsi a0, mnxti, MIE", by using "csrrw ra, mintsel_jal, ra", an entry address of an interrupt subroutine corresponding to an ID of a non-vectored interrupt in a CLIC mode can also be obtained from the interrupt vector table corresponding to this interrupt, the PC of the current instruction is updated to the ra register, and it is jumped to the entry of the interrupt subroutine; and in addition, because the PC of the current instruction can be updated to the ra register, when returning from the interrupt subroutine, the processor core will execute "csrrw ra, mintsel_jal, ra" again, which can achieve faster interrupt tail biting. It can be seen that by means of an instruction "csrrw ra, mintsel_jal, ra", it is realized that the entry of the corresponding non-vector interrupt subroutine is quickly entered after the context is saved or after interrupt tail biting.

The instruction "csrrw ra, jalmnxti, ra" is used to perform a series of operations after the context is saved, and then jump to the entry address of the interrupt subroutine corresponding to the interrupt ID; and is further used to perform a series of operations after non-vectored interrupt tail biting is occurred, and then jump to the entry of the interrupt subroutine corresponding to the interrupt ID.

Figure 4:
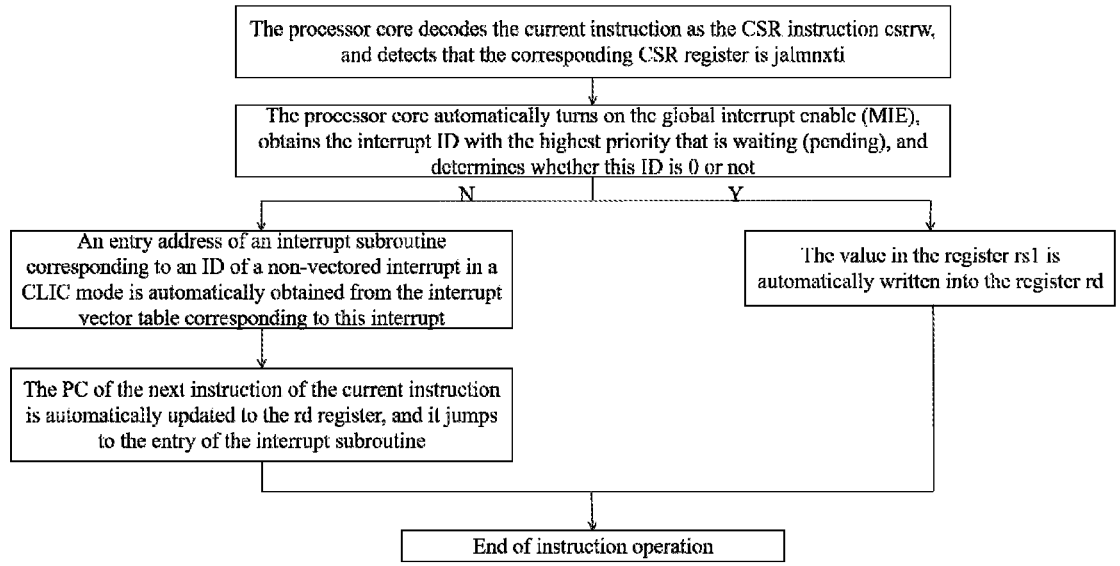
FIG. 4 is an operation flow chart of an instruction "csrrw rd, jalmnxti, rs1" disclosed in an embodiment of the present invention.

An operation flow of the instruction "csrrw ra, jalmnxti, ra" is as shown in FIG. 4: the processor core decodes the current instruction as the CSR instruction csrrw, and detects that the corresponding CSR register is jalmnxti; and the processor core will not execute the csrrw instruction according to the manner specified by the RISC-V official architecture, but automatically turns on the global interrupt enable (MIE), obtains the interrupt ID with the highest priority that is waiting (pending), and determines whether this ID is 0 or not, and if it is not 0, automatically obtains an entry address of an interrupt subroutine corresponding to an ID of a non-vectored interrupt in a CLIC mode from the interrupt vector table corresponding to this interrupt, automatically updates the PC of the next instruction of the current instruction to the ra register, and jumps to the entry of the interrupt subroutine; otherwise, if the interrupt ID is 0, the value in the register ra remains unchanged. In actual applications, rd and rs1 in FIG. 4 are generally link registers (ra). The instruction "csrrsi a0, mnxti, MIE" in the background art can only realize the functions of automatically turning on the global interrupt enable (MIE), obtaining the interrupt ID with the highest priority that is waiting (pending) and obtaining the pointer of the entry address of the interrupt subroutine of the current interrupt ID. However, in addition to the function of implementing the function of "csrrsi a0, mnxti, MIE", by using "csrrw ra, jalmnxti, ra", the entry address of the interrupt subroutine corresponding to an ID of a non-vectored interrupt in a CLIC mode can also be obtained from the interrupt vector table corresponding to this interrupt, the PC of the next instruction of the current instruction is updated to the ra register, and it is jumped to the entry of the interrupt subroutine. It can be seen that by means of an instruction "csrrw ra, jalmnxti, ra", it is realized that the entry of the corresponding non-vector interrupt subroutine is quickly entered after the context is saved or after interrupt tail biting.

An interrupt system for RISC-V architecture, the system comprising: an mstatus register, an medeleg register, an mideleg register, an mie register, an mtvec register, an mtvt register, an mscratch register, an mepc register, an mcause register, an mtval register, an mip register, an mnxti register, an mintstatus register, an mscratchcsw register and an mscratchcsw1 register, and further comprising: a swmcause instruction, and/or a swmepc instruction, and/or a jmnxti instruction, and/or an mtvt3 register;

wherein the swmcause instruction is used to store a value in the mcause on a stack by means of an instruction;

the swmepc instruction is used to store a value in the mepc on a stack by means of an instruction;

the jmnxti instruction is used to respond to the non-vectored interrupt request issued by a CLIC by means of an instruction; and the mtvt3 register is used to store a base address of an non-vectored interrupt in a CLIC mode.

The swmcause instruction is used to store a value in the mcause in a stack, and a corresponding instruction is: "swmcause offset (sp)";

the swmepc instruction is used to store a value in the mepc in a stack, and a corresponding instruction is: "swmepc offset (sp)"; and the jmnxti instruction is used to respond to a non-vector interrupt request issued by a CLIC, and a corresponding instruction is: "jmnxti ra".

Figure 5:
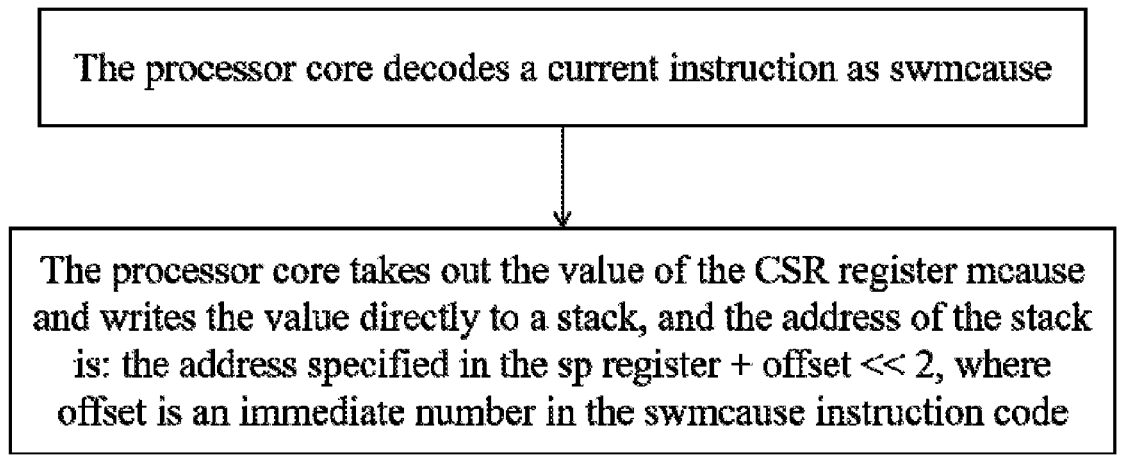
FIG. 5 is an operation flow chart of an instruction "swmcause offset(rs1)" disclosed in an embodiment of the present invention.

An operation flow of the instruction "swmcause offset (sp)" is as shown in FIG. 5: the processor core decodes a current instruction as swmcause; and the processor core takes out the value of the CSR register mcause and writes the value directly to a stack, and the address of the stack is: the address specified in the sp register+offset<<2, where offset is an immediate number in the swmcause instruction code.

Figure 6:
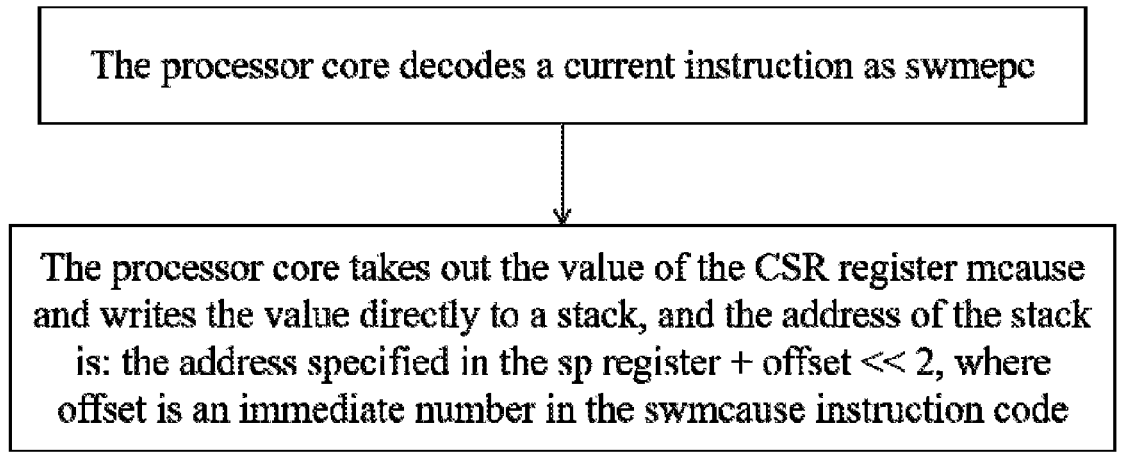
FIG. 6 is an operation flow chart of an instruction "swmepc offset(rs1)" disclosed in an embodiment of the present invention.

An operation flow of the instruction "swmepc offset(sp)" is as shown in FIG. 6: the processor core decodes a current instruction as swmcause; and the processor core takes out the value of the CSR register mcause and writes the value directly to a stack, and the address of the stack is: the address specified in the sp register+offset<<2, where offset is an immediate number in the swmcause instruction code.

An operation flow of the instruction "jmnxti ra" is as shown in FIG. 7: the processor core decodes the current instruction as jmnxti; the processor core automatically turns on the global interrupt enable (MIE), obtains the interrupt ID with the highest priority that is waiting (pending), and determines whether this ID is 0 or not, and if it is not 0, automatically obtains an entry address of an interrupt subroutine corresponding to an ID of a non-vectored interrupt in a CLIC mode from the interrupt vector table corresponding to this interrupt, automatically updates the PC of the current instruction to the ra register, and jumps to the entry of the interrupt subroutine; otherwise, if the interrupt ID is 0, the value in the register ra remains unchanged. In actual applications, rd and rs1 in FIG. 7 are generally link registers (ra).

The instruction "csrrsi a0, mnxti, MIE" in the background art can only realize the functions of automatically turning on the global interrupt enable (MIE), obtaining the interrupt ID with the highest priority that is waiting (pending) and obtaining the pointer of the entry address of the interrupt subroutine of the current interrupt ID. However, in addition to the function of implementing the function of "csrrsi a0, mnxti, MIE", by using "jmnxti ra", an entry address of an interrupt subroutine corresponding to an ID of a non-vectored interrupt in a CLIC mode can also be obtained from the interrupt vector table corresponding to this interrupt, the PC of the current instruction is updated to the ra register, and it is jumped to the entry of the interrupt subroutine; and in addition, because the PC of the current instruction can be updated to the ra register, when returning from the interrupt subroutine, the processor core will execute "jmnxti ra" again, which can achieve faster interrupt tail biting. It can be seen that by means of an instruction "jmnxti ra", it is realized that the entry of the corresponding non-vector interrupt subroutine is quickly entered after the context is saved or after interrupt tail biting.

Adding an mtvt2 register or an mtvt3 register can separate the non-vectored interrupt in the CLIC mode and the abnormality. In this way, in the response process of responding to the non-vector interrupt in the CLIC mode, it is not necessary to judge whether the mcause is abnormal or not, which can also accelerate the response speed of the non-vectored interrupt.

Taking the instruction "csrrw ra, mintsel_jal, ra" as an example, the operation of the instruction "csrrw ra, mintsel_jal, ra" is equivalent to the operation result of the five instructions in FIG. 8, which significantly reduces the operation time consumed by the instruction operation.

The above are only preferred implementations of the interrupt system for the RISC-V architecture disclosed in the present invention. It should be pointed out that for those of ordinary skill in the art, without departing from the inventive concept of the present invention, several modifications and improvements can also be made, all of which fall within the protection scope of the present invention.

What is claimed is:

1. An interrupt system applicable to RISC-V architecture, comprising a machine mode abnormality or interrupt return address register, a machine mode abnormality cause register, and a machine mode abnormality cause stack register, wherein
the machine mode abnormality cause stack register is a first control state register (CSR) register, and the first CSR register is configured to store a value in the machine mode abnormality cause register while writing into a stack by means of a first instruction.

2. The interrupt system applicable to the RISC-V architecture according to claim 1, wherein the first instruction is: "csrrwi x0, pushmcause, offset", and the first instruction includes an operator csrrwi, a destination operand x0, a csr register pushmcause, and an immediate number offset.

3. The interrupt system applicable to the RISC-V architecture according to claim 1, further comprising:
a machine mode abnormality or interruption return address stack register, in a core-local interrupt controller (CLIC) mode, wherein the machine mode abnormality or interruption return address stack register is a second CSR register, and the second CSR register is configured to store a value in the machine mode abnormality or interrupt return address register and directly write into a stack by means of a second instruction.

4. The interrupt system applicable to the RISC-V architecture according to claim 3, wherein the second instruction is: "csrrwi x0, pushmepc, offset", and the second instruction includes an operator csrrwi, a destination operand x0, a csr register pushmepc, and an immediate number offset.

5. The interrupt system applicable to the RISC-V architecture according to claim 3, further comprising:
an interrupt response register in the CLIC mode, wherein the interrupt response register is the third CSR register, and a third CSR register is configured to respond to a non-vectored interrupt request issued in the CLIC mode by means of a third instruction, obtain an interrupt subroutine entry address, and modify a global interrupt enable.

6. The interrupt system applicable to the RISC-V architecture according to claim 5, further comprising:
a base address register of a non-vectored interrupt in the CLIC mode, wherein the base address register of the non-vectored interrupt in the CLIC mode is a fourth CSR register, and the fourth CSR register is configured to separate the non-vectored interrupt in the CLIC mode and an abnormality entry and store a base address of the non-vectored interrupt in the CLIC mode.

7. The interrupt system applicable to the RISC-V architecture according to claim 3, further comprising:
a base address register of a non-vectored interrupt in the CLIC mode, wherein the base address register of the non-vectored interrupt in the CLIC mode is a fourth CSR register, and the fourth CSR register is configured to separate the non-vectored interrupt in the CLIC mode and an abnormality entry and store a base address of the non-vectored interrupt in the CLIC mode.

8. The interrupt system applicable to the RISC-V architecture according to claim 1, further comprising:
an interrupt response register in a core-local interrupt controller (CLIC) mode, wherein the interrupt response register is a third CSR register, and the third CSR register is configured to respond to a non-vectored interrupt request issued in the CLIC mode by means of a third instruction, obtain an interrupt subroutine entry address, and modify a global interrupt enable.

9. The interrupt system applicable to the RISC-V architecture according to claim 8, wherein the interrupt response register is a mintsel_jal register or a jalmnxti register, and in the mintsel_jal register, the third instruction is: "csrrw ra, mintsel_jal, ra"; and in the jalmnxti register, the third instruction is: "csrrw ra, jalmnxti, ra".

10. The interrupt system applicable to the RISC-V architecture according to claim 9, wherein the third instruction "csrrw ra, mintsel_jal, ra" includes an operator csrrw, a destination operand ra, a csr register mintsel_jal, and a source operand ra, is configured to automatically turn on the global interrupt enable after a context is saved, automatically obtain a first entry address of a first interrupt subroutine corresponding to a first ID of the non-vectored interrupt in the CLIC mode from an interrupt vector table corresponding to the interrupt, automatically update a program counter of a first current instruction to a ra register, and jump to an entry of the first interrupt subroutine; and is further used to automatically turn on the global interrupt enable after a non-vectored interrupt tail biting occurs, automatically obtain a second entry address of a second interrupt subroutine corresponding to a second ID of the non-vectored interrupt in the CLIC mode from the interrupt vector table corresponding to the interrupt, automatically update a program counter of a second current instruction to the ra register, and jump to an entry of the second interrupt subroutine.

11. The interrupt system applicable to the RISC-V architecture according to claim 9, wherein the third instruction "csrrw ra,jalmnxti,ra" includes an operator csrrw, a destination operand ra, a csr register jalmnxti, and a source operand ra, and is configured to automatically turn on the global interrupt enable after a context is saved, automatically obtain a first entry address of a first interrupt subroutine corresponding to a first ID of the non-vectored interrupt in the CLIC mode from an interrupt vector table corresponding to the interrupt, automatically update a next program counter of a first current instruction to a ra register, and jump to an entry of the first interrupt subroutine; and is further configured to automatically obtain a second entry address of a second interrupt subroutine corresponding to a second ID of the non-vectored interrupt in the CLIC mode from the interrupt vector table corresponding to the interrupt after a non-vectored interrupt tail biting occurs, automatically update a next program counter of a second current instruction to the ra register, and jump to an entry of the second interrupt subroutine.

12. The interrupt system applicable to the RISC-V architecture according to claim 1, further comprising:
   a base address register of a non-vectored interrupt in a core-local interrupt controller (CLIC) mode, wherein the base address register of the non-vectored interrupt in the CLIC mode is a fourth CSR register, and the fourth CSR register is configured to separate the non-vectored interrupt in the CLIC mode and an abnormality entry and store a base address of the non-vectored interrupt in the CLIC mode.

13. The interrupt system applicable to the RISC-V architecture according to claim 1, further comprising:
   an interrupt response register in a core-local interrupt controller (CLIC) mode, wherein the interrupt response register is the third CSR register, and the third CSR register is configured to respond to the non-vectored interrupt request issued in the CLIC mode by means of the third instruction, obtain the interrupt subroutine entry address, and modify the global interrupt enable, and
   a base address register of the non-vectored interrupt in the CLIC mode, wherein the base address register of the non-vectored interrupt in the CLIC mode is the fourth CSR register, and the fourth CSR register is configured to separate the non-vectored interrupt in the CLIC mode and an abnormality entry and store the base address of the non-vectored interrupt in the CLIC mode.

14. An interrupt system applicable to RISC-V architecture, comprising: a machine mode abnormality or interrupt return register, a machine mode abnormality cause register, a mcause data direct write instruction, wherein
   the mcause data direct write instruction is configured to store a value in the machine mode abnormality cause register while directly writing the value on a stack by means of a first instruction.

15. The interrupt system applicable to the RISC-V architecture according to claim 14, wherein in the mcause data direct write instruction, the first instruction is: "swmcause offset (sp)", and the first instruction includes an operator swmcause, a source operand sp, and an immediate number offset.

16. The interrupt system applicable to RISC-V architecture according to claim 14, further comprising:
   a mepc data direct write instruction, the mepc data direct write instruction is configured to store a value in the machine mode abnormality or interrupt return register and directly write a value of a current interrupt return address on a stack by means of a second instruction.

17. The interrupt system applicable to RISC-V architecture according to claim 14, further comprising:
   an interrupt entry jump instruction configured to respond to a non-vectored interrupt request issued by a core-local interrupt controller (CLIC) by means of a third instruction.

18. The interrupt system applicable to RISC-V architecture according to claim 14, further comprising:
   a base address register for a non-vectored interrupt in a core-local interrupt controller (CLIC) mode, wherein the base address register of the non-vectored interrupt in the CLIC mode is configured to separate the non-vectored interrupt in the CLIC mode and an abnormality entry and store a base address of the non-vectored interrupt in the CLIC mode.

* * * * *